United States Patent [19]

DeLuca et al.

[11] Patent Number: 5,025,252
[45] Date of Patent: Jun. 18, 1991

[54] PAGING RECEIVER WITH OVER-THE-AIR CHARACTERIZATION OF CALL SIGNAL PROCESSING

[75] Inventors: Michael J. DeLuca; Gregory O. Snowden, both of Boca Raton; Robert D. Fennell, Coral Springs, all of Fla.

[73] Assignee: Motorola, Inc., Schaumburg, Ill.

[21] Appl. No.: 431,112

[22] Filed: Nov. 3, 1989

[51] Int. Cl.⁵ .............................................. H04B 7/00
[52] U.S. Cl. ........................ 340/825.44; 340/825.27; 455/186
[58] Field of Search ........... 340/311.1, 825.44, 825.45, 340/825.46, 825.47, 825.48, 309.15, 309.4, 825.26, 825.27, 825.21; 455/38, 186, 343

[56] References Cited

U.S. PATENT DOCUMENTS

| | | | |
|---|---|---|---|
| 4,422,071 | 12/1983 | deGraaf | 340/825.44 |
| 4,424,514 | 1/1984 | Fennell et al. | 340/825.52 |
| 4,639,726 | 1/1987 | Ichikawa et al. | 340/825.44 |
| 4,706,272 | 11/1987 | Nishimura et al. | 379/57 |
| 4,839,641 | 6/1989 | Mori et al. | 340/825.48 |
| 4,845,491 | 7/1989 | Fascenda et al. | 340/825.47 |
| 4,851,829 | 7/1989 | DeLuca et al. | 340/825.44 |
| 4,868,561 | 9/1989 | Davis | 340/825.44 |
| 4,894,649 | 1/1990 | Davis | 340/309.4 |
| 4,910,510 | 5/1990 | Davis et al. | 340/825.44 |

OTHER PUBLICATIONS

NEC Instruction Manual of R3D4-5A, -7A Pager, 4th Edition, published Jul. 1987, pp. 1-8, Section 1.4.3.

Primary Examiner—Donald J. Yusko
Assistant Examiner—Dervis Magistre
Attorney, Agent, or Firm—William E. Koch; Vincent B. Ingrassia; Gregg Edward Rasor

[57] ABSTRACT

A paging receiver is operative to receive and accept a call signal including a receiver characterization portion which is decoded by the paging receiver to govern processing operations, characterized by the characterization portion, in regard to call signals corresponding to specified assigned call addresses of the paging receiver. In one embodiment, the receiver characterization portion of a call signal includes at least one characterization code and corresponding memory location code for storage of the characterization code in a memory of the paging receiver. Each memory location code corresponds to an assigned call address code of the paging receiver. In another embodiment, the receiver characterization portion of a call signal includes a specified assigned call address code and a characterization code corresponding thereto, in which case, the characterization code of the call signal is stored in a memory of the paging receiver based on the corresponding specified assigned call address code of the call signal.

23 Claims, 11 Drawing Sheets

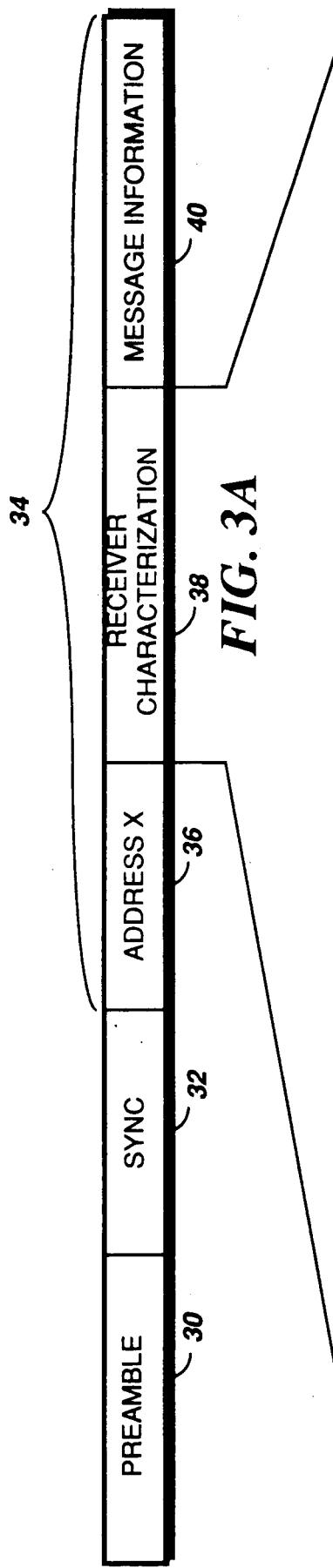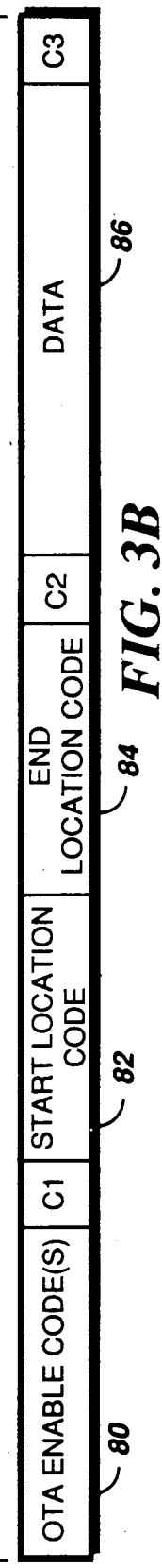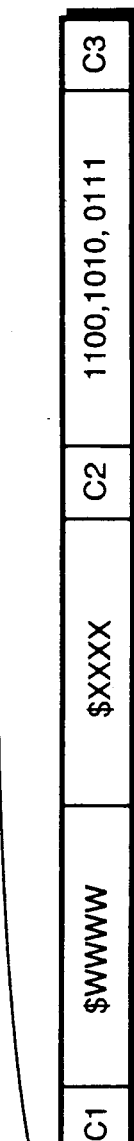
FIG. 3A  FIG. 3B  FIG. 3C

| SLOT TO MESSAGE MEMORY TABLE ||
|---|---|
| SLOT 1 | MEMORY X |
| SLOT 2 | MEMORY Y |
| ⋮ | ⋮ |
| SLOT N | MEMORY Z |

*FIG. 6*

| MODEL: XYZ | CODE PLUG LOCATION CODE ||
|---|---|---|
| CALL CODE ADDRESS | CHARAC. CODE | DISABLED MESSAGE |
| ADDR. X | $WWWW | $YYYY |
| ADDR. Y | ⋮ | ⋮ |
| ADDR. Z | $XXXX | $ZZZZ |
| ⋮ | | |

*FIG. 7*

| CODE PLUG | DISABLE | ALERT | STORE | INDICATE | 52 |
|---|---|---|---|---|---|
| ADDRESS X | 53 | 54 | 55 | 56 | DISABLED MESSAGE |
| ADDRESS Y | | | | | DISABLED MESSAGE |
| ADDRESS Z | | | | | DISABLED MESSAGE |

*FIG. 13*

PAGING RECEIVER WITH OVER-THE-AIR CHARACTERIZATION OF CALL SIGNAL PROCESSING

BACKGROUND OF THE INVENTION

The present invention relates to paging receivers, in general, and more particularly, to a paging receiver operative to receive and accept a call signal including a receiver characterization portion which is decoded by the paging receiver to govern processing operations, characterized by the characterization portion, in regard to call signals corresponding to specified assigned call addresses of the paging receiver.

In modern paging systems, a common carrier transmits call signals to its subscribers utilizing a predetermined transmission protocol. The subscribers may lease or purchase a paging receiver from the common carrier for receiving page calls and/or messages contained in the call signals transmitted by the common carrier. The carrier may provide a wide variety of message services, like individual messages, group type messages, and messages containing information like stock quotes, sporting event scores, and the like, for example. A subscriber may subscribe to any one or more of these services in which case, his or her paging receiver is programmed with a call address for each such service. Accordingly, a subscriber is generally required to pay a flat rate on a monthly or a quarterly basis to the common carrier for each service to which he or she is subscribing. For example, a subscriber may have a paging receiver programmed with a unique individual call address, a group call address which may be common to a number of other subscribers, and an information service call address which would be common to all subscribers of the information service.

The common carrier is confronted with the problem of what to do when a subscriber fails to remain current in the rate payments for one or more of the services he or she is subscribing to. A desirable approach would be to have paging receivers capable of being disabled and re-enabled by the transmitted call signals of the common carrier.

Examples of proposed paging receivers for carrying out these objectives are found in the following U.S. Patents: U.S. Pat. No. 4,639,726, entitled "Radio Communication Apparatus Disabled on Reception of a Predetermined Signal", issued Jan. 27, 1987 to Ichikawa et al.; and U.S. Pat. No. 4,706,272, entitled "Paging Communication System", issued Nov. 10, 1987, to Nishimura et al.

The Ichikawa patent appears to be directed to a paging receiver which may be non-recoverably disabled by a call signal transmitted from a paging terminal. Once disabled, the paging receiver would have to be taken to a special reprogramming center in order to re-enable the receiving operations thereof. The paging receiver of Ichikawa may include certain "canned" messages in its memory which may be displayed upon being disabled.

On the other hand, the Nishimura patent appears to be directed to a paging receiver which may be disabled and re-enabled with call signals. In the Nishimura paging receiver, a single assigned call signal is accepted and examined for either an inhibit or restart instruction. The inhibit instruction inhibits display of subsequent messages received by the inhibited paging receiver. Conversely, the restart instruction releases the display inhibition mode of the paging receiver and allows it to subsequently process and indicate messages on the display of the paging receiver.

Another known paging receiver is believed to respond to a call signal having a disabled instruction which causes the paging receiver to cease searching for all but one of its programmed call addresses. The pager may subsequently be enabled upon the reception of a call signal including the remaining active programmed address followed by a unique data message including an enable instruction.

The aforementioned proposed paging receivers appear to include a number of drawbacks. One such drawback is that the disabled paging receivers are apparently not capable of storing received messages of a disabled service, nor are they apparently capable of indicating to the subscriber the number of messages received and stored while the service is disabled. In addition, none of the proposed paging receivers are capable of receiving and processing a message for display on a display of the paging receiver to be displayed during disablement of a particular service to provide the subscriber of the reason(s) why the particular service has been disabled. Still further, the foregoing described paging receivers do not offer a way of recovering transmitted messages during a period of disablement.

Another area of concern involves, for example, a subscriber which subscribes to a plurality of services including individual and information type messages and fails to remain current on the rate payments for the information services while continuing to pay for the individual message service. The present state-of-the-art paging systems do not appear to be capable of over-the-air disabling and re-enabling a specified service without affecting the other subscribed services of a subscriber's paging receiver. Information messages is one service which is inherently difficult for a common carrier to disable and re-enable regarding an individual subscriber.

The present invention is directed to a paging receiver which overcomes the aforementioned drawbacks and offers other advantages and features not found in paging receivers of the foregoing described type. These features and advantages will become more evident from the following description of the preferred embodiment and associated drawings.

SUMMARY OF THE INVENTION

In accordance with one aspect of the present invention, a paging receiver has a plurality of assigned call address codes for receiving and accepting a call signal which is transmitted from an external source and includes a call address code substantially consistent with at least one assigned call address code of the plurality. The paging receiver includes memory means for storing the plurality of assigned call address codes. The accepted call signal includes, at times, message information associated with the assigned call address code thereof and further includes, at times, a receiver characterization portion including at least one characterization code and corresponding memory location code for storage of the characterization code in the memory means. Each of the memory location codes corresponds to an assigned call address code of the paging receiver.

In accordance with the one aspect of the present invention, the paging receiver comprises: means for decoding an accepted call signal to obtain each characterization code and corresponding memory location code thereof; means for storing each obtained characterization code in the memory means based on its corresponding memory location code; and control means governed by the decoded characterization code of an assigned call address code to selectively enable and disable processing operations, characterized by the characterization code, in regard to call signals corresponding to the assigned call address code.

In accordance with another aspect of the present invention, the receiver characterization portion includes a specified assigned call address code and a characterization code corresponding thereto, in which case, the paging receiver comprises: means for decoding the accepted call signal to obtain the specified assigned call address code and corresponding characterization code thereof; and control means governed by the decoded characterization code of a specified assigned call address code to selectively enable and disable processing operations, characterized by the characterization code, in regard to call signals corresponding to the specified assigned call address code.

Another aspect of the present invention is directed to a paging receiver having at least one assigned call address code for receiving and accepting a call signal. Regarding this aspect, the paging receiver comprises means governed by the obtained characterization code to selectively enable and disable the storage of message information of an accepted call signal corresponding to the at least one assigned call address code by the storing means.

BRIEF DESCRIPTION OF THE DRAWINGS

FIGS. 3A, 3B, and 3C illustrate a call signal transmission format and examples thereof suitable for use in the paging system depicted in FIG. 1.

FIG. 6 is an illustration of memory organization of another portion of the RAM suitable for use in the embodiment of FIG. 1.

FIG. 7 is an example of a table correlating call address codes with paging receiver code plug locations suitable for use in the paging terminal of the embodiment of FIG. 1.

FIG. 13 illustrates a memory organization of the code plug of the paging receiver of FIG. 1 in connection with the alternate transmitted call signal protocol of FIGS. 11A-11E.

DETAILED DESCRIPTION OF THE PREFERRED EMBODIMENT

Figure 1:
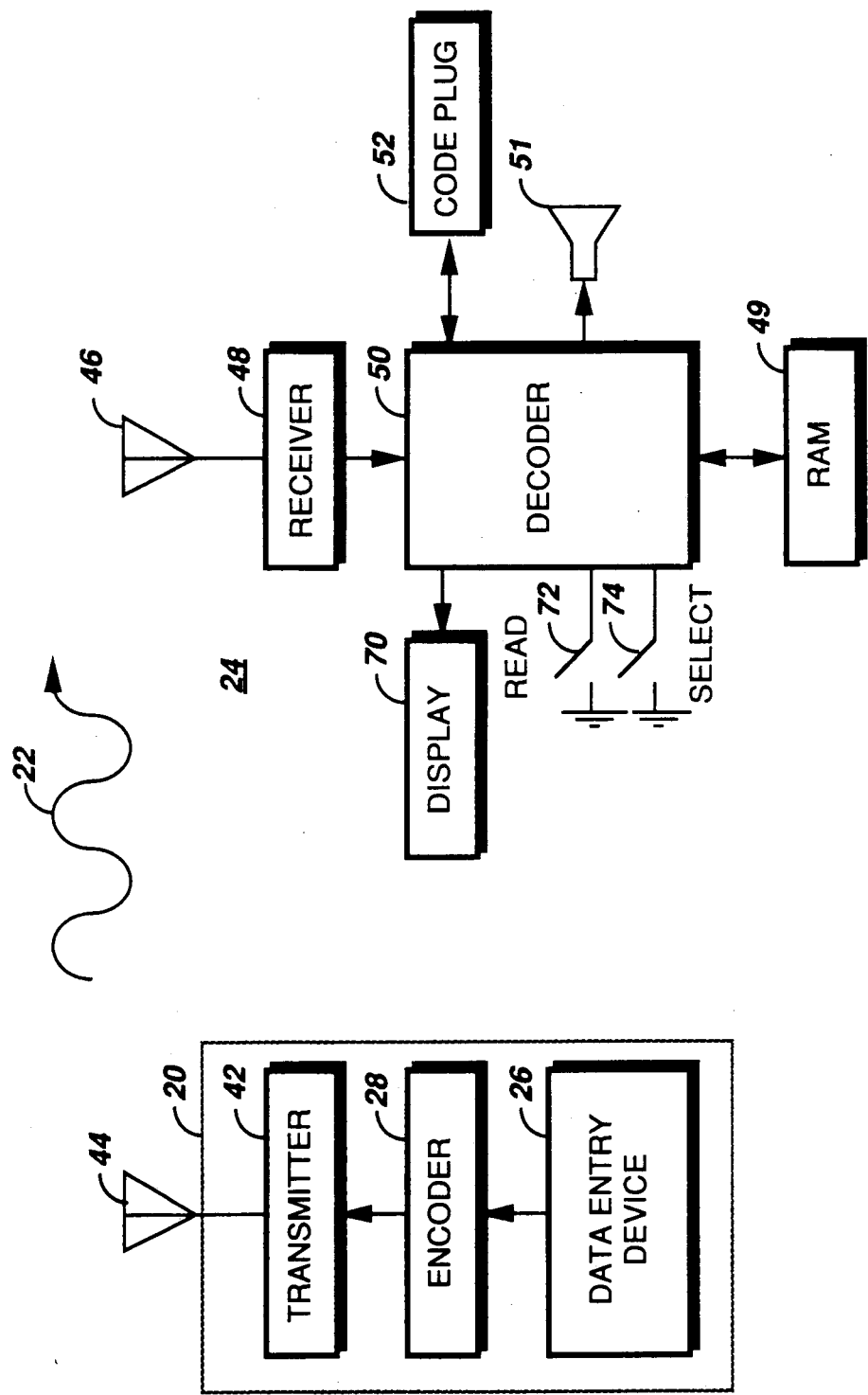
FIG. 1 is a block diagram schematic of a paging system suitable for embodying the principles of the present invention.

FIG. 1 is a block diagram schematic of a paging system including a paging receiver suitable for embodying the principles of the present invention. Referring to FIG. 1, a paging terminal 20 may be operated by a common carrier to transmit call signals 22 over-the-air to a paging receiver 24. The paging terminal 20 may include a conventional data entry device 26 which is utilized to enter the unique call address of a paging receiver or receivers and the information to be transmitted to such designated paging receiver(s) in the form of a call signal. The entered information and paging receiver designation may be provided to a conventional encoder 28 which digitally encodes a call signal in a pre-specified transmission protocol which may be similar to that shown in the illustration of FIG. 3A.

Referring to FIG. 3A, in the present example, the call signal transmission format may include a digitally coded preamble 30 followed by a digital sync code 32 which is followed one or more call signals 34. The preamble portion 30 and sync portion 32 of the transmission are used primarily for battery saving operations of the paging receivers and are not considered part of the present invention. The call signal portion of the transmission 22 includes a digitally coded call address 36 and, at times, a receiver characterization portion 38. The call signal portion 34 may further include, at times, a message information portion 40.

Referring back to FIG. 1, the properly encoded call signals are provided to a conventional transmitter 42 of the terminal 20 which drives a transmitter antenna 44 to radiate the call signals at a channel carrier frequency over-the-air to the paging receivers of the various subscribers, including the paging receiver 24.

The paging receiver 24 which is considered typical of the paging receivers of the subscribers of the common carrier paging system includes an antenna 46 for receiving the radiated call signals 22 and conducting them to a receiver section 48 where they are superheterodyned and demodulated to recover the digitally coded informational content thereof. The demodulated signals are provided, in turn, to a decoder section 50 which determines whether or not to accept a call signal. More specifically, call signals which include a call address code 36 that is substantially consistent with at least one of the call address codes assigned to the pager are accepted by the decoder section 50. When a call signal is accepted, the decoding section 50 may generate a call alert utilizing a conventional audio transducer 51 or a similar alert transducer. For more details of a paging receiver including a decoder section, reference is made to the instruction manual 68P81050C95-0 of the "PMR 2000" Series Alphanumeric Pager published 1987 by Motorola, Inc., which publication is incorporated by reference herein.

Figures 4, 5:
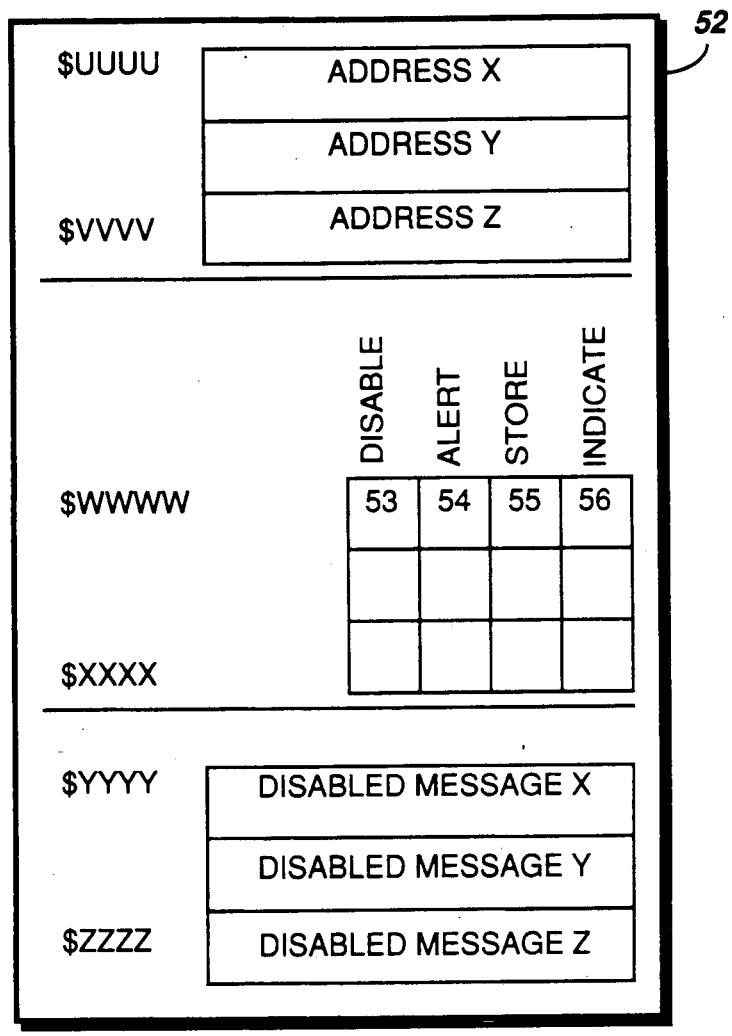
FIG. 4 is an illustration of memory organization of a code plug suitable for use in the paging system of FIG. 1.
FIG. 5 is an illustration of memory organization of a message memory of a random access memory (RAM) suitable for use in the embodiment of FIG. 1.

The paging receiver 24 also includes a programmable non-volatile memory 52, generally referred to as a code plug, and a random access memory (RAM) 49, both memories being coupled to and accessible by the decoder 50. In the preferred embodiment, the code plug memory 52 may be organized in sections or groups of registers which may be programmed with the assigned address codes X, Y, and Z, for example, of the paging receiver and characterization codes and disabled messages corresponding thereto. FIG. 4 depicts an illustration of a code plug organization for such purposes. For example, the assigned address codes of the paging receiver 24 may be programmed into the memory registers starting at location $UUUU and ending at location $VVVV. Characterization codes respectively associated with each of the assigned call addresses X, Y, and Z may be found in the registers having locations starting at $WWWW and ending at location $XXXX. Finally, auxiliary or disabled messages respectively associated with the assigned address codes may be programmed into the registers starting at location $YYYY and ending at the location $ZZZZ. Further in the present embodiment, each characterization code of an assigned call address may include four binary bits 53-56 with each bit characterizing a corresponding processing operation of the paging receiver and, depending upon the binary setting of a particular bit, the corresponding processing operation of the paging receiver may be enabled or disabled. This aspect of the present invention will be explained in greater detail hereinbelow.

Still further, the RAM 49 may be organized to include a portion of registers to store message information corresponding to an assigned address code of an accepted call signal. FIG. 5 illustrates a suitable organization for these purposes. Referring to FIG. 5, each memory portion designated as memory 1 through memory N may include a status code 58 indicative of whether or not the corresponding message information has been read by the subscriber which will become better understood from the discussion found hereinbelow. Another portion 60 of the RAM 49 includes information corresponding to the age of the corresponding message information. A portion 62 contains the assigned address code of the message and, finally, a portion 64 provides storage space for the message information itself. This information contained in the portions 58, 60, 62, and 64 may be accessed by the decoder 50 from the RAM 49 for utilization in carrying out the processing operations thereof in regard to an accepted call signal.

Figure 2:
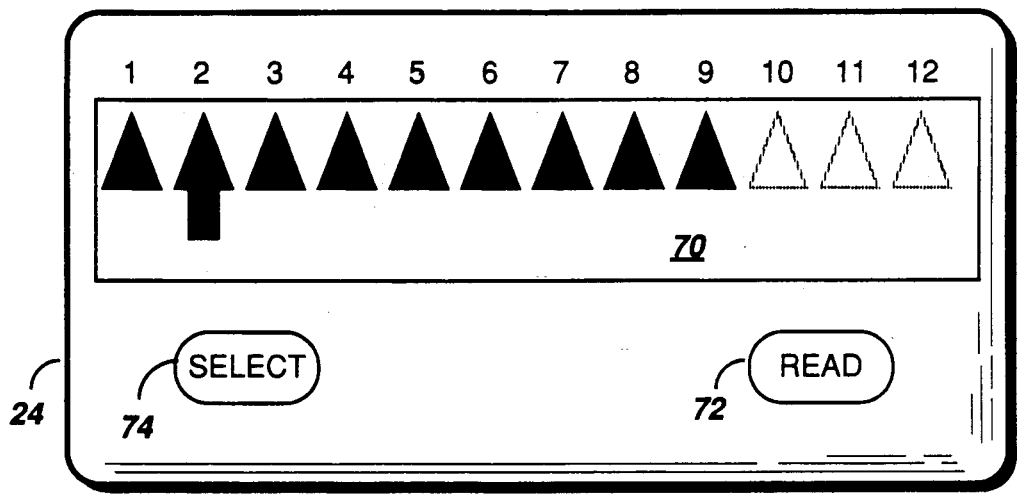
FIG. 2 is an illustration of the front panel and display of a paging receiver used for depicting display indicators of stored messages of the paging receiver.

The paging receiver 24 may further include a display 70 and a read pushbutton 72 and a select pushbutton 74 associated therewith. The display 70 is utilized by the paging receiver 24 to display to a subscriber the status of received and accepted message information, and at times, the message information itself or a disabled message, as the case may be. The front panel and display 70 of a typical paging receiver 24 is shown in the illustration of FIG. 2. This particular paging receiver has the capacity to store message information of twelve call signals. The status of each message information storage slot 1-12 is indicated y an arrow tip under its corresponding slot number 1-12 of the display 70. For example, a darkened arrow tip represents read message information, a blinking arrow tip shown shaded represents unread messages, and a clear arrow tip represents available memory slots having no message content. A message information may be selected by selecting a slot indication of the display 70 utilizing the select pushbutton 74. In the present example, the arrow tip takes upon a body member as shown in slot 2, for example, when the slot is selected. The RAM 49 may include an additional memory portion containing a slot to message memory table similar to that shown in FIG. 6. In the table, the address of the message information relating to a slot is stored in the corresponding slot such that a one-to-one relationship exists. In this manner, each of the slot indicators are correlated with the memory portion containing the associated message information and assigned address code (refer to FIG. 5).

The present embodiment, the receiver characterization portion 38 of a call signal 34 may include various fields in connection with providing a disabled message and/or characterization code(s) to the paging receiver 24 which disabled message and/or characterization code may be programmed by the decoder 50 into the code plug 52 for non-volatile storage thereof. Referring to FIG. 3B, an initial field 80 of the receiver characterization portion 38 may include over-the-air (OTA) enable code(s) which may comprise various control characters and password codes for security purposes. Following the field 80 may be a character C1 indicating a memory location field including a starting memory location code 82 and an ending memory location code 84 for programming the code plug 52. The fields 82 and 84 may be followed by a delimiting character C2 which may be followed by a data field 86 which may include one or more characterization codes or a disabled message. The characterization portion 38 concludes with a character C3.

For an example of a receiver characterization portion 38 of a call signal 34 containing programming information for both characterization codes and a disabled message, refer to FIG. 3C. In this example, the starting location code is $ZZZZ and the ending location code is 13 hex memory locations from the starting location. Reference to the code plug organization as depicted in FIG. 4 reveals that the starting location code $ZZZZ is the storage location for a disabled message corresponding to the assigned address code Z. Thus, that which is contained in the data field 86 corresponding to the aforementioned starting and ending memory location codes is a disabled message having approximately 19 characters.

Further in the example of FIG. 3C, after the first data field, the character C1 reappears in the characterization portion indicating that another set of memory location codes is present and includes the starting and ending location codes $WWWW to $XXXX, respectively. Referring to the code plug organization of FIG. 4, it is revealed that these code plug memory locations have been assigned to characterization codes corresponding to the assigned call address codes X, Y, and Z, respectively. Thus, the codes 1100, 1010, and 0111 contained in the following data field are programmed into the corresponding memory locations of the code plug 52 by the decoder 50. Accordingly, these newly programmed characterization codes are used to characterize the processing operations of the decoder 50 in regard to the handling of alerts and message information corresponding to the call signals of the assigned call address codes of the paging receiver.

In order for a terminal of a common carrier to correlate the memory locations of a characterization code and/or disabled message in the code plug of a particular pager model with an assigned call address code thereof, a table similar to that shown in FIG. 7 may be included in the data entry device 26 so as to provide the proper code plug memory location information to the encoder 28 for encoding the call signal in accordance with the protocol described in connection with FIG. 3B.

In the present embodiment, the characterization code associated with each assigned address code of a paging receiver includes four binary coded bits 53, 54, 55, and 56, for example, as shown in FIG. 4. As described hereabove, each characterization code characterizes the processing operations of the decoder 50 of the paging receiver 24 in regard to alerts and messages received thereby. For example, bit 53, when set in one binary state, may disable the display of a selected message corresponding to the assigned address code of the characterization code from being displayed on the display 70 when the read pushbutton 72 is activated. Similarly, when the bit 53 is programmed in the converse binary state, the message display operation is re-enabled. Similarly, the bit 54 of the characterization word selectively enables and disables the call alert when a call signal is received and accepted corresponding to the associated call address code of the characterization code. Likewise, bit 55 selectively enables and disables the storage of a message received on a call address code corresponding to the characterization code. Characterization bit 56 selectively enables and disables the indication of the storage of a message on the display 70 in connection with the corresponding assigned address code. These and other aspects of the characterization codes of the various assigned address codes will become more evident in connection with the description of the flow charts of FIGS. 8-10 which represent suitable operational processing algorithms programmed into the decoder 50.

Figure 8:
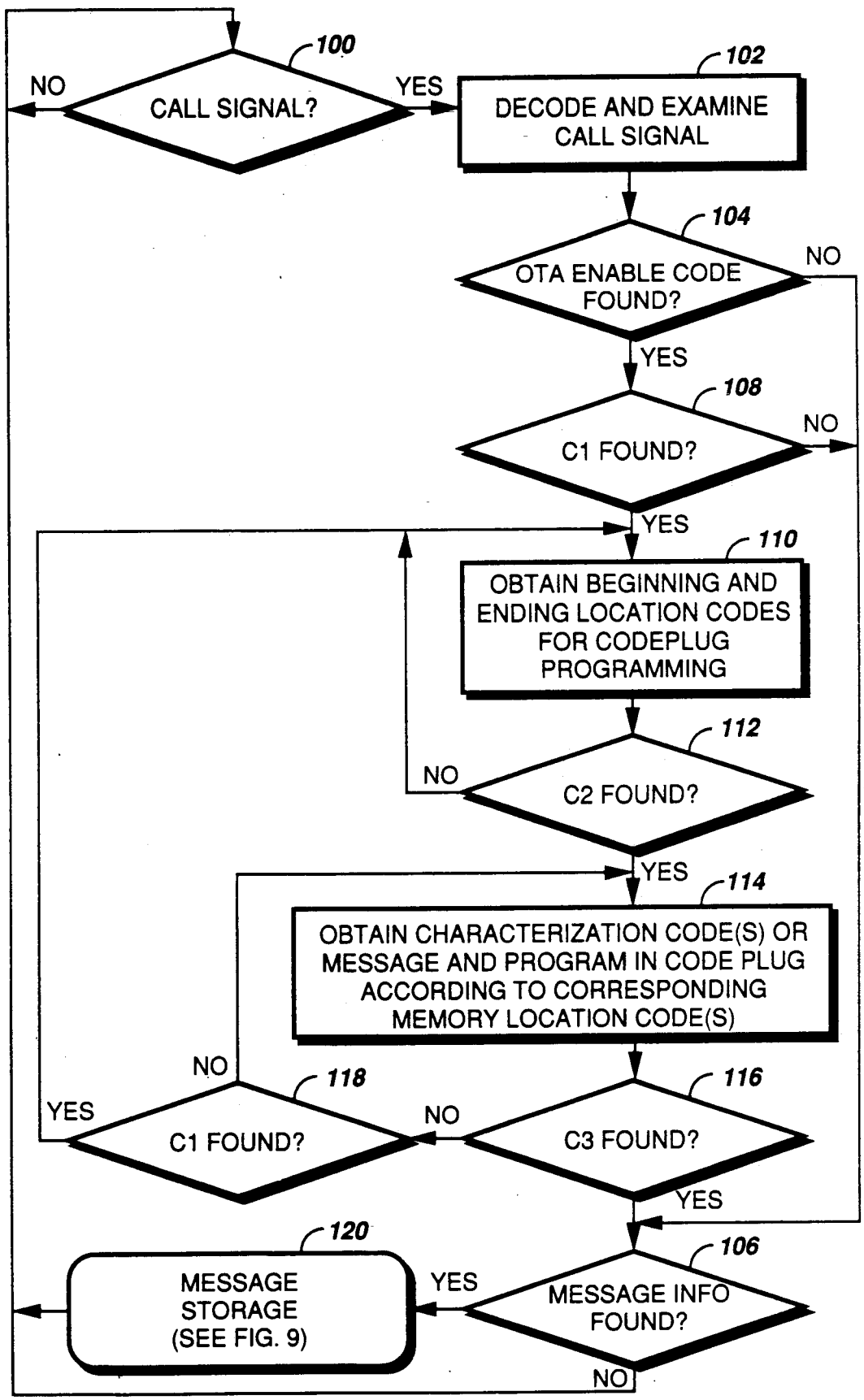
FIGS. 8-10 are flow charts which depict suitable operational processing algorithms for use in the decoder of the paging receiver of the embodiment of FIG. 1.

Referring to FIG. 8, the decisional block 100 decides whether or not a call signal is accepted by the decoder section 50 of the paging receiver 24. More particularly, when a demodulated call signal is provided from the receiver 48 to the decoder 50, the call address code thereof is compared to the assigned call address codes X, Y, and Z programmed into the code plug of the paging receiver. When the call address code thereof is substantially consistent with at least one of the assigned call address codes, the call signal is considered accepted and the program execution continues at block 102. Otherwise, the received call signal is not accepted and the program awaits the next received call signal. In block 102, the remainder of the accepted call signal is decoded and examined to determine whether or not it contains a proper receiver characterization portion and/or a proper message information portion (refer to FIGS. 3A-3C).

Continuing, the OTA enable code 80 is first examined in the decisional block 104 to determine whether it contains the proper control characters and/or password for reprogramming the code plug with new characterization codes or a disabled message. If the enable code is found to be improper, program execution continues at the decisional block 106. Otherwise, the program execution next looks for a character C1 to determine whether or not memory location codes are present in the characterization portion 38. If no C1 character is found, execution is again referred to block 106. If the character C1 is found, the program execution continues at block 110 wherein the beginning and ending code plug memory locations are obtained for use in programming the code plug. Thereafter, the program searches for a delimiting character C2 in block 112. When C2 is found, the instructions of block 114 obtains the characterization code(s) or disabled message of the data field and programs the obtained data into the code plug according to the corresponding memory location codes obtained in block 110.

Thereafter, the program searches for either the end of field character C3 in decisional block 116 or another character C1, which indicates the beginning of another memory location code field, utilizing the decisional block 118. Should another character C1 be found, then the program blocks 110, 112, 114 are repeated. An illustration of this example is shown in FIG. 3C which depicts a receiver characterization portion containing two memory location code fields, one for a disabled message and the other for characterization codes. When the character C3 is eventually found as determined by the decisional block 116, the decisional block 106 is executed to identify whether or not there is message information 40 included in the corresponding call signal. If no message information is found, program execution is exited and the program algorithm waits for the next received call signal. If message information is found, then a message storage algorithm represented by block 120 is executed.

Figure 9:
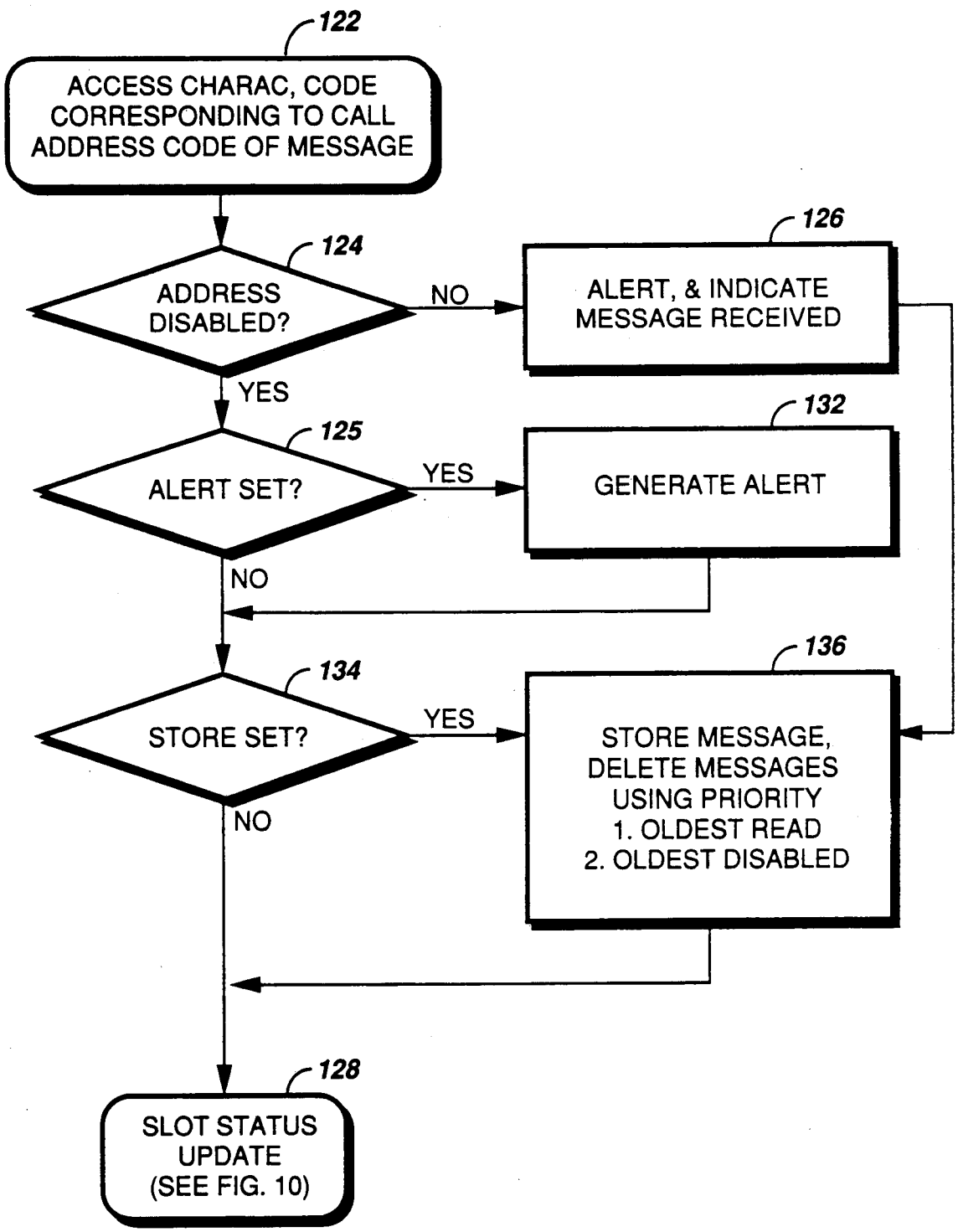

A suitable message storage algorithm in connection with the present invention is shown in FIG. 9. Referring to FIG. 9, the initial block 122 of the message storage algorithm accesses from the code plug 52 the characterization code corresponding to the assigned address code of the corresponding message information. In decisional block 124, it is determined whether or not the corresponding assigned address code has been disabled by examining bit 53 thereof. If bit 53 indicates that the address is not disabled, then program execution continues in block 126 where the call signal alert is generated, and an indication is provided on the display that a message has been stored in one of the allowable slots of the RAM 54 memory and program execution continues at block 136.

On the other hand, if the bit 53 of the examined characterization code indicates that the address is disabled, the decisional block 125 is next executed to examine bit 54 to determine if the call signal alert processing operation has been set. If it has been set, then program execution is diverted to block 132 to generate the call signal alert. Upon exiting block 132 or when the alert bit is not set, program execution is continued at the decisional block 134 to examine bit 55 of the characterization code to determine whether the processing operation of storing the corresponding message information in the RAM 54 has been set. If it has been set, program execution continues at block 136 wherein such message information is stored in RAM along with the assigned address code thereof.

In the event that the message storage portion of the RAM 54 is filled, then a certain stored message may be deleted using a priority algorithm in order to render an available memory slot for the most recently accepted message information. In the present embodiment, when the message memory is filled, the priority algorithm searches for the oldest read message by examining the memory portions 58 and 60 of each memory slot containing message information and stores the instant message information in the memory slot of the identified oldest read message. If no read messages are found in the message memory, the priority algorithm then determines the oldest stored message of a disabled address code by examining the disabled bit of the characterization word of the assigned address code thereof. The instant message information is then stored in the memory slot containing the oldest disabled message. If no stored messages of a disabled assigned address code are found in the message memory, the priority algorithm may select the memory slot of another stored message in accordance with a predetermined priority level similar to that disclosed in U.S. Pat. No. 4,851,829, issued to DeLuca et al., which is hereby incorporated by reference. Thereafter, program execution is continued at block 128. If the bit 55 of the characterization word is not set to store the corresponding message information as determined by the decisional block 134, then the message storage processing operations of block 136 are circumvented and program execution continues in block 128 wherein the slot status update algorithm is performed.

Figure 10:
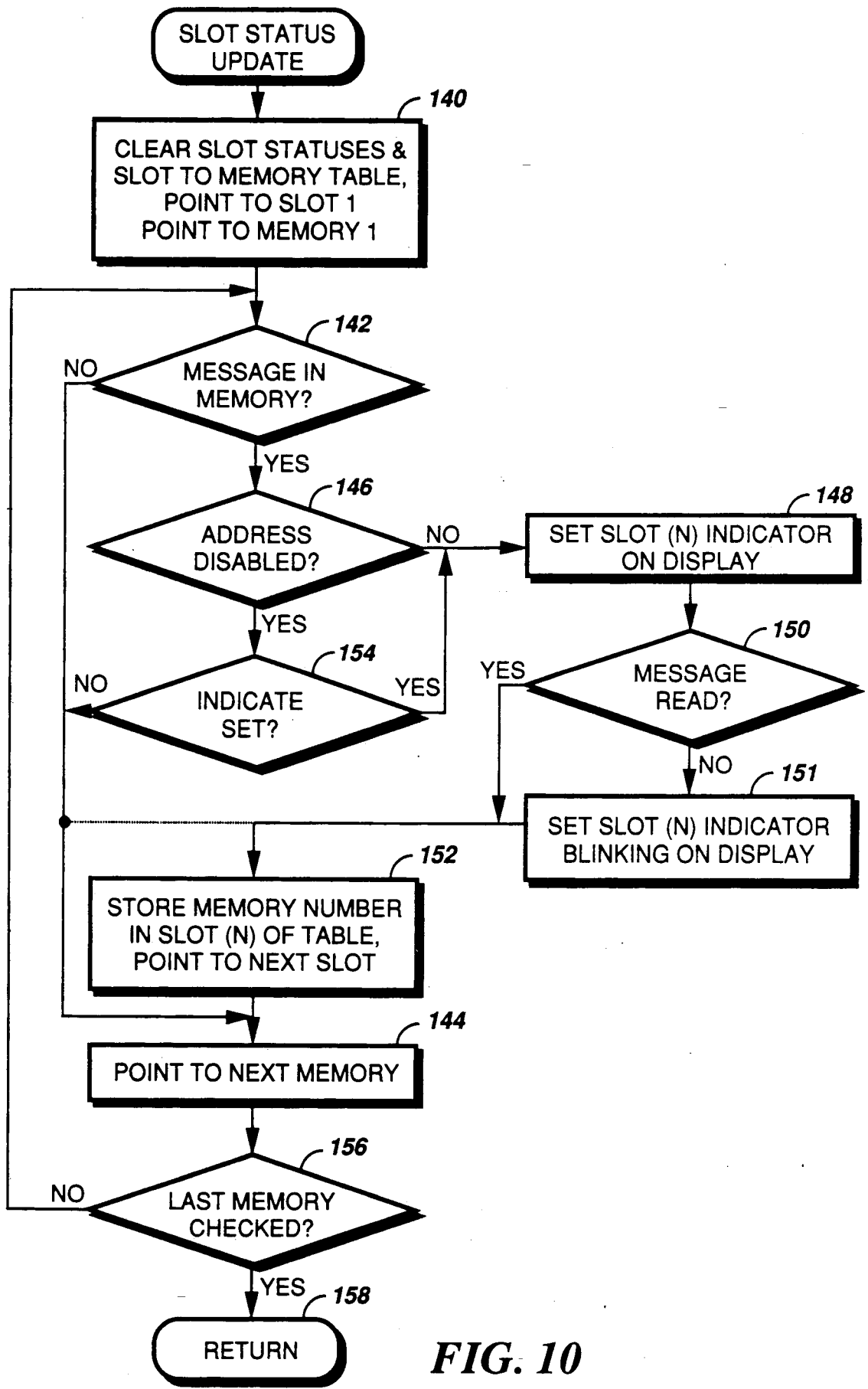

A suitable slot status update algorithm for use in the flow chart of FIG. 9 is depicted in the flow chart of FIG. 10. Referring to FIG. 10, the initial program block 140 of the slot status update algorithm clears the slot statuses which are displayed on display 70 of the paging receiver (refer to FIG. 2). In addition, the block 140 also clears the slot-to-message memory table which is contained in a portion of the RAM 54 and described in connection with FIG. 6. Thereafter, a first pointer is pointed to the address of slot 1 of the slot-to-message memory table as shown in FIG. 6, and a second pointer is pointed to the address of memory 1 of the message memory as shown in FIG. 5. Next, in block 142, it is determined whether or not there is message information stored in the memory addressed by the second pointer. If the message slot is empty, program execution continues at block 144; otherwise, decisional block 146 is next executed to determine whether or not the assigned address code of the corresponding stored message is disabled. This may be accomplished by examining the disable bit 53 of the characterization code associated with the assigned address code being considered and stored in the code plug 52.

If the assigned address code of the corresponding stored message is not disabled, then the corresponding slot indicator on the display is set in block 148. The setting of a slot indicator on the display 70 has been described hereabove in connection with the illustration of FIG. 2. Next, the decisional block 150 determines whether the corresponding message has been read by examining the portion 58 of the selected memory slot and, if not read, the corresponding indicator on the display 70 will be caused to blink by block 151. This is illustrated in FIG. by the indicators 7, 8, and 9 which are shaded. If the portion 58 indicates a read message, program execution is continue at block 152 wherein the location of the message memory corresponding to the second pointer is stored in the slot-to-message memory table next to the slot corresponding to the first pointer and the first pointer is then incremented to the location of the next slot of the slot-to-message memory table. Program execution continues at block 144.

Returning now to the decisional block of 146 and taking the case where the assigned address code corresponding to the selected memory slot is disabled, in which case, program execution is continued at decisional block 154 where the indicate bit, bit 56, of the characterization word corresponding to the assigned address code of the corresponding message information is examined and, if set, the program steps of 148, 150, and 151 are repeated. Otherwise, such program steps are circumvented, thereby disabling the display indication of a stored message of a disabled assigned address code.

Program execution continues at block 144 from block 142, 154, or 152 and therein the second pointer is incremented to the location of the next memory slot of the message memory. Thereafter, it is determined in the decisional block 156 if the last memory slot of the message memory has been checked, and if so, the program execution is returned to the main program by the instruction of block 158. If the last memory slot has not been checked, then program execution is returned to the decisional block 142 and the process is repeated for each memory slot of the message memory in RAM 54 until the entire slot status indication of the display 70 is updated.

In the foregoing described embodiment of the invention, message indications of memory slots having messages of enabled address codes stored therein are, when enabled, displayed contiguously. This phenomenon is illustrated in FIG. 2 wherein the arrow points of slots 1-9 indicate either read or unread messages. Normally, the clear arrow points of slots 10-12 are intended to provide an indication of no messages being stored therein. However, for the present embodiment, indications 10-12 may not only represent empty memory slots, but may also represent memory slots which store messages of disabled address codes, i.e. in one mode, no indication is provided to the user regarding stored message information of a disabled address code. Accordingly, upon re-enabling of a previously disabled address code, the message indicators thereof will appear contiguously on the display as indications of unread messages to the user.

In an alternate embodiment, the message indicators may be displayed discontiguously. In this alternate embodiment, a negative result of either step 142 or step 154 causes execution of step 152 (as shown by the dashed arrowed line) instead of step 144, in which case, the slot pointer and the memory pointer always move in unison. In this manner, if a memory slot is vacant or stores a message of a disabled address code, an indicator, when disabled, will not be set for that slot. Referring to FIG. 2, suppose an address code corresponding to a stored message in a memory slot, say memory slot 4, for example, is disabled. Accordingly, the arrow pointer associated therewith would be displayed clear instead of darkened as shown in FIG. 2. In this example then, the arrow points of the slots provide discontiguous indications regarding stored messages, i.e. slots 1-3 and 5-9 would indicate stored messages while slots 4 and 10-12 would provide no indication.

In the preferred embodiment as described hereabove, the paging terminal has the burden of identifying the pager model XYZ and where in the code plug memory of the particular model to store the characterization code and/or disabled message of an assigned address code of a pager in regard to a characterizing call signal. This apriori information may be stored as a table in a memory of the paging terminal to establish the proper correlation (refer to FIG. 7). In an alternate embodiment of the present invention, the aforementioned burden may be shifted to the individual paging receivers. Such an alternate embodiment will be now described in connection with FIGS. 11A-11E and FIG. 12.

Figure 11:
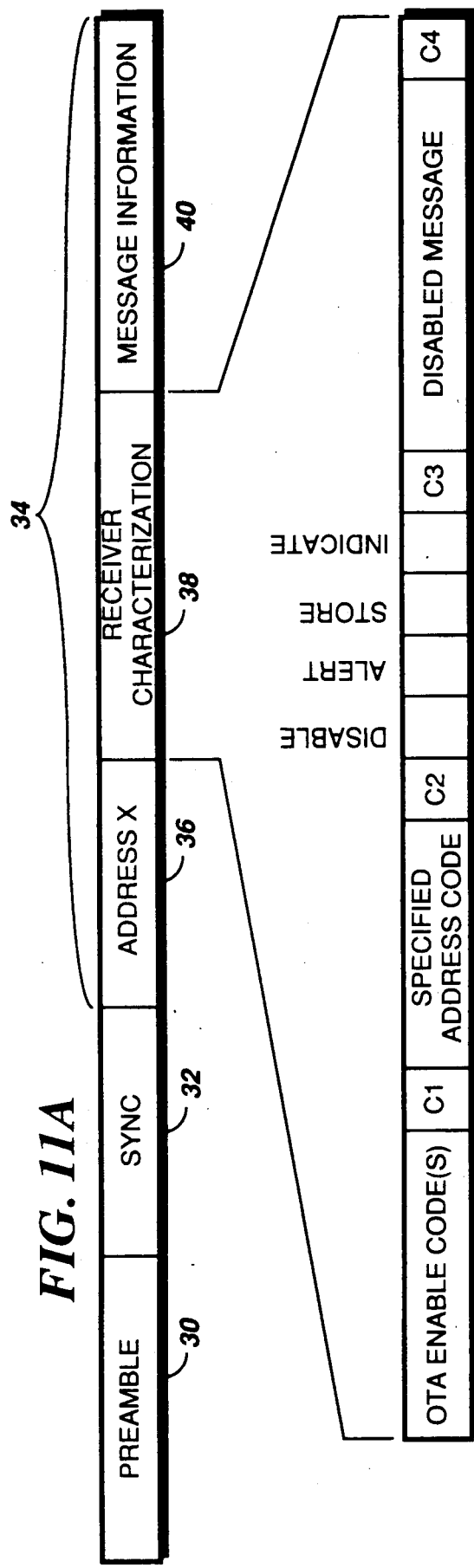
FIGS. 11A-11E illustrate a transmitted call signal format and examples thereof regarding an alternate embodiment of a paging receiver for use in the paging system of FIG. 1.

Referring to FIG. 11A, the protocol of a transmitted call signal 34 remains substantially the same as that described in connection with the preferred embodiment shown in FIG. 3A. However, the receiver characterization portion 38 of the call signal 34 is altered from that described in connection with FIG. 3B and will now be described in relation to FIG. 11B. Referring to FIG. 11B, after the OTA enable code 80, a character C1 may be included for identifying that a specified address code follows for the purposes of setting or updating a characterization code and/or disabled or auxiliary message corresponding thereto. Another character C2 in the characterization portion 38 identifies that a characterization code associated with the specified address code is included and follows the character C2. Another character C3 indicates that a disabled message is included in the characterization portion 38 and follows the character C3. Finally, a character C4 indicates the end of the receiver characterization portion of the call signal 34. FIGS. 11C, 11D, and 11E are illustrations of examples of various characterization portions of a call signal. In the example of FIG. 11C, the specified address code "address Z" follows the character C1, the characterization code "1111" follows the character C2, a disabled message follows the character C3, and the characterization portion concludes with the character C4. In the example of FIG. 11D, the specified address code "address Z" follows character C1, the characterization code "0111" follows the character C2, and in this example, there is no disabled message and the characterization portion 38 concludes with the character C4. Finally, in the example of FIG. 11 a characterization code "1010" follows the character C2 and the characterization portion 38 concludes with the character C4. In the example of FIG. 11E, note that there is no specified address code or disabled message in which case, the characterization code applies to all of the assigned address codes of the paging receiver.

Figure 12:
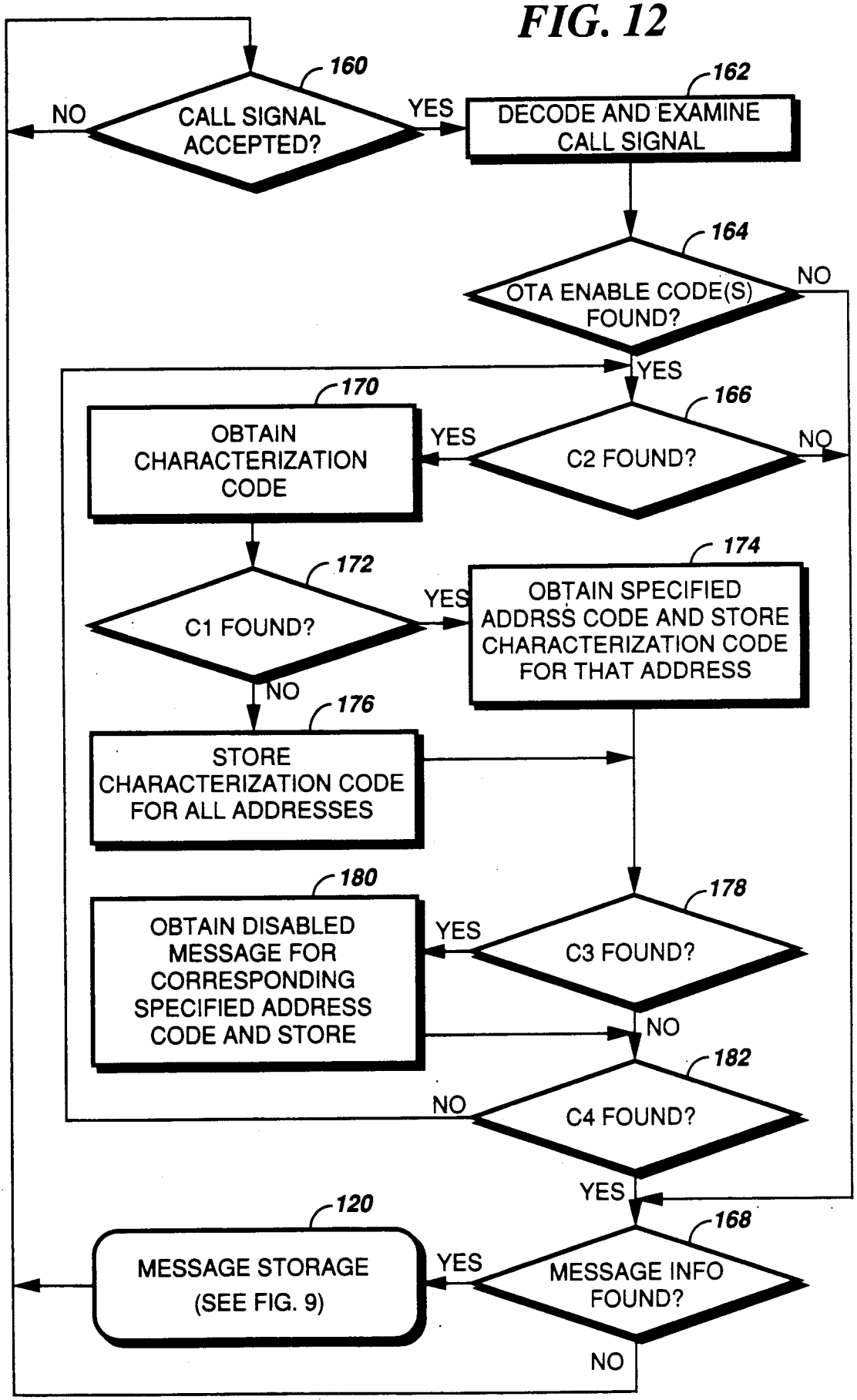
FIG. 12 is a flow chart of an algorithm for controlling the processing operations of the decoder of the paging receiver of FIG. 1 in connection with the alternate call signal protocol depicted in FIGS. 11A-11E.

A suitable program algorithm for programming the decoder of the paging receiver for controlling the processing operations thereof in connection with the alternate embodiment is shown in the flow chart of FIG. 12. Referring to FIG. 12, the initial decisional block 160 determines whether or not a received call signal has been accepted by the paging receiver. If not accepted, the decoder remains in a waiting loop for the next received call signal. If accepted, the call signal is decoded and examined in the instructional block 162. Next, the OTA enable codes of the receiver characterization portion of the accepted call signal are examined and, if proper, the program execution continues at the decisional block 166. Otherwise, program execution is diverted to the decisional block 168.

Returning to the decisional block 166, if a C2 character is found in the characterization portion, the associated characterization code is obtained using block 170. Thereafter, the algorithm searches for a C1 character using the decisional block 172. If character C1 is found, the specific address code associated therewith is obtained, and the characterization code obtained by the block 170 is stored in the code plug in a memory slot associated with the corresponding specified address code, according to the instructions of block 174. An example of an alternate organization of the code plug memory for use in conjunction with the alternate embodiment is shown in FIG. 13. Note that the bits of the characterization code 53-56 as well as the disabled message are stored in the same memory slot as their corresponding assigned address code. Returning to the decisional block 172, in the event that no character C1 is found in the characterization portion of the call signal, the characterization code obtained by the block 170 is stored in the code plug for all of the assigned addresses by block 176 (see FIG. 13).

After execution of blocks 174 or 176, the program flow continues at the decisional block 178 wherein the characterization portion is examined to determine whether or not a character C3 is present. If character C3 is present, the following disabled message is obtained and stored in the code plug memory in a slot corresponding to its corresponding specified address code by the instructional block 180. On the other hand, if no character C3 is found or upon exiting the execution of block 180, program flow continues at the decisional blocks 82 and 166 in which the characterization portion of the call signal is examined for either the ending character C4 or the character C2. If character C2 is found, program execution continues at block 170. If neither character C2 nor C4 is found or if character C4 is found, program execution continues at the decisional block 168. In the decisional block 168, the program examines the content of the call signal to determine whether a message information corresponding to the call address code 36 thereof is present. If no message information is present, the program execution returns to the decisional block 160. Otherwise, if message information is present, the message storage algorithm, as described in connection with the flow chart of FIG. 9, is executed by the instructional block 120.

Figure 14:
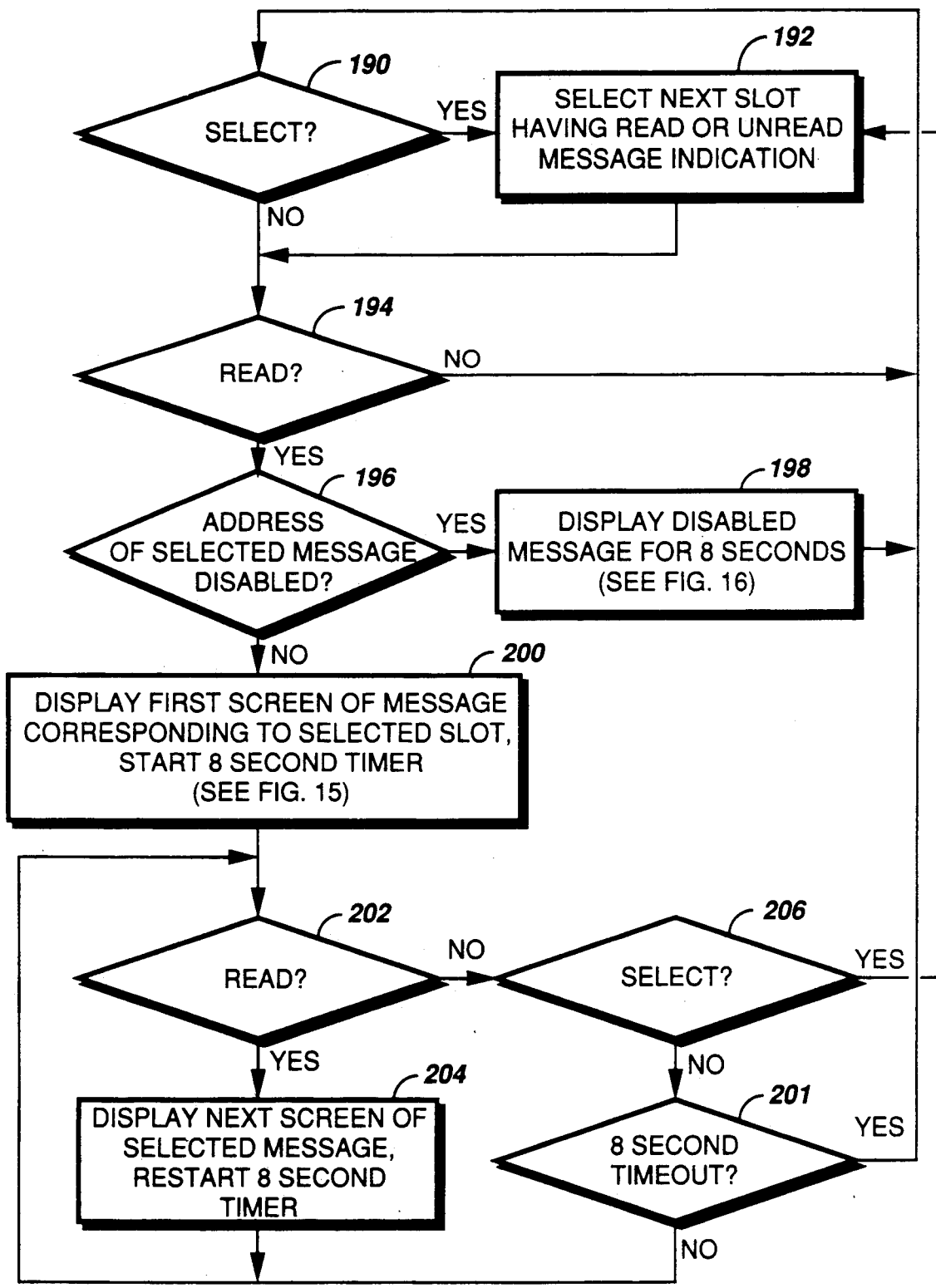
FIG. 14 is a flow chart which depicts a suitable algorithm for use by the decoder of the paging receiver of FIG. 1 in operating the display thereof.

FIG. 14 is a flow chart which represents a suitable algorithm for use by the decoder 50 in operating the display 70 of the paging receiver 24. Referring to FIG. 14, the decisional block 190 monitors the select button 74 and when activated, executes the instructions of block 192 to move the selection of a slot indicator to the next slot from left to right. For example, in FIG. 2, slot 2 is presently selected as the message slot to be read and, if the select pushbutton 74 is activated, slot 3 becomes the next selected slot, in which case, the body of the arrow disappears from slot 2 and reappears at the arrow point of slot 3. If the select pushbutton has not been activated as determined by block 190 or the instructions of block 192 have been executed, then the decisional block 194 is next executed to examine whether or not the read pushbutton 72 has been activated. If not, program execution is returned to the decisional block 190; otherwise, the characterization code of the assigned address code corresponding to the selected message as indicated by the slot indication on the display 70 is examined by the decisional block 196 to determine whether or not the status of the corresponding address code is enable or disable.

Figure 16:
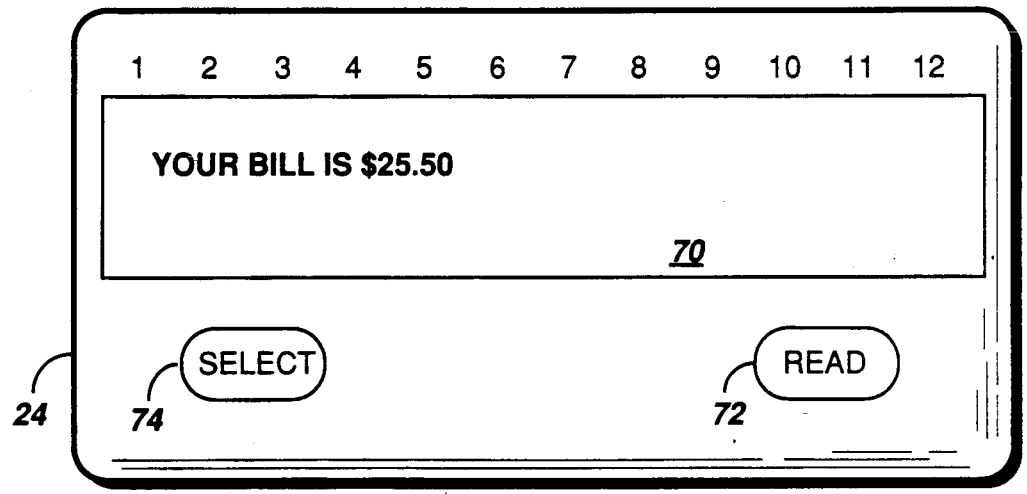

For example, if address X is the assigned address code of the message of slot 2 which is the selected slot, then the bit 53 of the characterization code associated therewith (refer to FIG. 13) is examined to determine whether or not that particular assigned address code is disabled. If found to be disabled, the disabled message found in the code plug memory slot associated with the disabled address code is displayed on the display 70 for eight seconds by the instructions of block 198. An example of a disabled message being displayed on the display 70 of the paging receiver is shown in the illustration of FIG. 16. After execution of block 198, the program flow continues at the decisional block 190.

Figure 15:
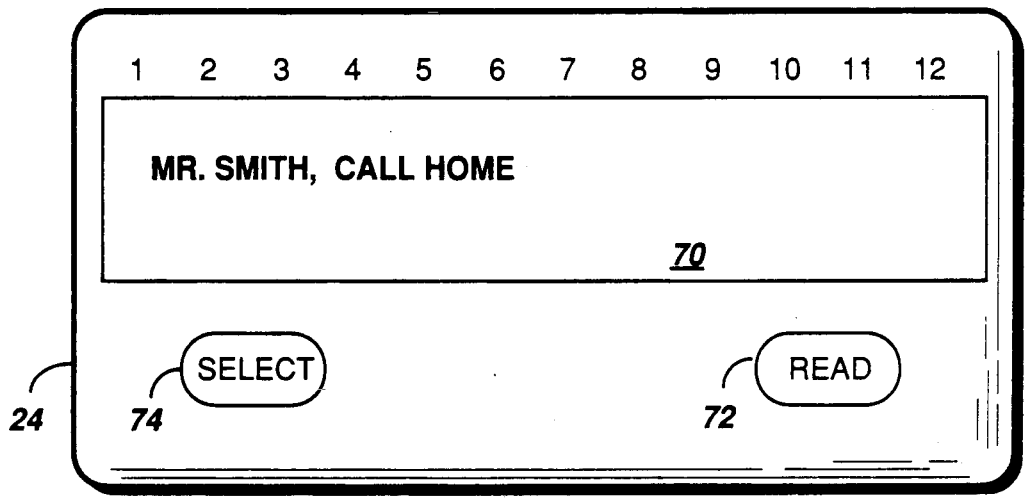
FIGS. 15 and 16 illustrate the display of message information on the display of a paging receiver suitable for use in the embodiment of FIG. 1.

If the assigned address code of the selected message is determined to be enabled by the decisional block 196, the first screen of the selected message is displayed on the display 70 by the instructional block 200. An example of a display of message information is shown in the illustration of FIG. 15. When the read pushbutton 72 is depressed during an eight-second display interval as determined by the decisional blocks 201 and 202, the next screen of the selected message is displayed on the display 70 and the eight-second timer is restarted by the instructional block 204. Should the select pushbutton 74 be activated instead of the read pushbutton during the eight-second time interval as detected by the block 206, then program execution continues at block 192. Otherwise, if the eight-second time interval times out without either of the read or select pushbutton being activated, the message indication display (see FIG. 2) is restored and program execution continues at block 190.

In the foregoing described embodiments, the processing operations of the paging receiver in regard to an accepted call signal are governed by the characterization codes of the assigned call address codes thereof. For example, the characterization code of an assigned call address code may govern the display and storage of message information, the display of storage indication thereof, and the display selection of either a disabled message or a selected message based on a selected display indication. However, while the present invention has been described in connection with a preferred and an alternate embodiment, it is understood that additions, deletions, or modifications may be made to one or the other of such embodiments to provide an equivalent embodiment without deviating from the principles of the present invention. Accordingly, the present invention should not be limited to any one embodiment, but rather construed in breadth and scope in accordance with the recitation of the appended claims.

What is claimed is:

1. A paging receiver being assigned at least one call address code for receiving and accepting a call signal, transmitted from an external source and including a call address code substantially consistent with said at least one assigned call address code of said receiver, said accepted call signal having a protocol capable of including message information associated with said at least one assigned call address code and a characterization code corresponding to said at least one assigned call address code, said paging receiver including a display; means responsive to a display command to display selected message information on said display; and means governed by the characterization code of said accepted call signal to disable said at least one assigned call address code such that received message information of said disabled at least one assigned call address code is prevented from being displayed on said display by said display means; said paging receiver comprising:
first means for decoding and examining said accepted call signal to identify the presence of and obtain message information associated with the call address code thereof;
means for storing said obtained message information of said accepted call signal;
second means for decoding and examining said accepted call signal to identify the presence of and obtain the characterization code thereof corresponding to said at least one assigned call address code; and
means governed by said obtained characterization code to selectively enable and disable the storage of obtained message information corresponding to said disabled at least one assigned call address code by said storing means.

2. The pager receiver in accordance with claim 1 including:
means for displaying on said display an indication for each message information stored by said storing means; and
means governed by the obtained characterization code to selectively enable and disable the display of each indication of stored message information corresponding to said disabled at least one assigned call address code on said display.

3. The paging receiver in accordance with claim 1 wherein the protocol of the accepted call signal is further capable of including an auxiliary message corresponding to the disabled at least one assigned call address code; and including:
means for displaying on said display an indication for each message information stored by said storing means;
means for selecting a stored message information for display on said display by selecting the corresponding displayed indication;
means for decoding and examining said accepted call signal to identify the presence of and obtain said auxiliary message corresponding to the disabled call address code and for storing said obtained auxiliary message; and
means governed by the obtained characterization code to control the selecting means between displaying the selected message information and the stored auxiliary message corresponding to the disabled assigned call address code.

4. The paging receiver in accordance with claim 3 including:
non-volatile memory means; and
means for storing the obtained auxiliary message in said non-volatile memory means.

5. The paging receiver in accordance with claim 1 including a memory having a plurality of memory slots; wherein the storing means selects a memory slot of said memory for storing obtained message information, said selection process including the condition when all memory slots are filled with message information, in which case, the storing means selects a memory slot according to a predetermined priority based on the characteristic code of the assigned address code of the corresponding message information to be stored.

6. The paging receiver in accordance with claim 1 including:
non-volatile memory means; and
means for storing the obtained characterization code in said non-volatile memory means.

7. A paging receiver being assigned at least one call address code for receiving and accepting a call signal, transmitted from an external source and including a call address code substantially consistent with said at least one assigned call address code of said receiver, said accepted call signal having a protocol capable of including a characterization code corresponding to said at least one assigned call address code, said paging receiver including a display; means responsive to a display command to display selected message information on said display; and means governed by the characterization code of said accepted call signal to disable said at least one assigned call address code such that received message information of said disabled at least one assigned call address code is prevented from being displayed on said display by said display means, said paging receiver comprising:

means for alerting a user of said accepted call signal;

means for decoding and examining said accepted call signal to identify the presence of and obtain the characterization code thereof corresponding to said at least one assigned call address code; and means governed by said obtained characterization code to selectively enable and disable the alerting means for alerting said user of an accepted call signal corresponding to said disabled at least one assigned call address code.

8. A paging receiver being assigned a plurality of call address codes for receiving and accepting a call signal, transmitted from an external source and including a call address code substantially consistent with at least one assigned call address code of said plurality, said paging receiver including memory means for storing said plurality of assigned call address codes, said accepted call signal having a protocol capable of including message information associated with the assigned call address code thereof and a receiver characterization portion including at least one characterization code and corresponding memory location code for storage of said characterization code in said memory means, each said memory location code corresponding to an assigned call address code of said paging receiver, said paging receiver including a display; means responsive to a display command to display selected message information on said display; and means governed by the characterization code of said accepted call signal to disable the assigned call address code corresponding thereto such that received message information of said disabled assigned call address code is prevented from being displayed on said display by said display means, said paging receiver comprising:

means for decoding and examining said accepted call signal to identify the presence of and obtain each characterization code and corresponding memory location code thereof;

means for storing each obtained characterization code in said memory means based on its corresponding memory location code; and control means governed by the obtained characterization code of each disabled assigned call address code to selectively enable and disable message information processing operations, characterized by said characterization code, in regard to call signals corresponding to each disabled assigned call address code.

9. The paging receiver in accordance with claim 8 including means for decoding and examining said accepted call signal to identify the presence of and obtain message information associated with the call address code thereof; and means for storing in said memory means said obtained message information; and wherein the control means includes means governed by the obtained characterization code of each disabled assigned call address code to selectively enable and disable the storage of message information corresponding to each disabled assigned call address code by said storing means, 10. The paging receiver in accordance with claim 9 wherein the memory means includes a plurality of memory slots; and wherein the message information storing means selects a memory slot of said memory means for storing decoded message information, said selection process including the condition when all memory slots are filled with message information, in which case, the storing means selects a memory slot according to a predetermined priority based on the characterization code of the assigned address code of the corresponding message information to be stored.

11. The paging receiver in accordance with claim 9 including means for displaying on said display an indication for each message information stored in said memory means; and wherein the control means includes means governed by the obtained characterization code of each disabled assigned call address code to selectively enable and disable the display of each indication on said display in regard to stored message information corresponding to each disabled assigned call address code.

12. The paging receiver in accordance with claim 9 including means for displaying on said display an indication for each message information stored in the memory means, means for selecting a stored message information by selecting the corresponding displayed indication on said display, and means for reading said selected message information by displaying it on said display; wherein the protocol of the accepted call signal is further capable of including an auxiliary message and a corresponding memory location code for storage of said auxiliary message in said memory means, each said memory location code corresponding to an assigned address code of said paging receiver; including means for decoding and examining said accepted call signal to identify the presence of and obtain said auxiliary message and corresponding memory location thereof based on a disabled assigned call address code, and means for storing said obtained auxiliary message in the memory means based on its corresponding memory location code; and wherein the first means includes means governed by the obtained characterization code corresponding to the disabled assigned call address code of the selected message information to control the reading means to select between displaying the selected message information and the stored auxiliary message of the assigned address code corresponding to the selected message information.

13. The paging receiver in accordance with claim 12 wherein the memory means includes a non-volatile memory; and wherein each auxiliary message is stored in said non-volatile memory based on its corresponding memory location code.

14. The paging receiver in accordance with claim 8 wherein the memory means includes a non-volatile memory; and wherein each characterization code is stored in said non-volatile memory based on its corresponding memory location code.

15. The paging receiver in accordance with claim 8 including means for alerting a user of the accepted call signal; and wherein the control means includes means governed by the obtained characterization code of each disabled assigned address code to selectively enable and disable the alerting means for alerting said user of the accepted call signal corresponding to each disabled assigned address code.

16. A paging receiver being assigned a plurality of call address codes for receiving and accepting a call signal, transmitted from an external source and including a call address code substantially consistent with at least one assigned call address code of said plurality, said accepted call signal having a protocol capable of including message information associated with the assigned call address code thereof and a receiver characterization portion including a specified assigned call address code and a characterization code corresponding thereto, said paging receiver comprising:

means for decoding and examining said accepted call signal to identify the presence of and obtain the specified assigned call address code and corresponding characterization code thereof; and control means governed by the obtained characterization code of said specified assigned call address code to selectively enable and disable message information processing operations, characterized by said characterization code, in regard to call signals corresponding to said specified assigned call address code.

17. The paging receiver in accordance with claim 16 including means for decoding and examining said accepted call signal to identify the presence of and obtain message information associated with the call address code thereof; memory means; and means for storing in said memory means obtained message information; and wherein the control means includes means governed by the obtained characterization code of the specified assigned call address code to selectively enable and disable the storage of message information corresponding to said specified assigned call address code by said storing means.

18. The paging receiver in accordance with claim 17 wherein the memory means includes a plurality of memory slots; and wherein the message information storing means selects a memory slot of said memory means for storing decoded message information, said selection process including the condition when all memory slots are filled with message information, in which case, the storing means selects a memory slot according to a predetermined priority based on the characterization code of the assigned address code of the corresponding message information to be stored.

19. The paging receiver in accordance with claim 17 including a display; and means for displaying on said display an indication for each message information stored in said memory means; and wherein the control means includes means governed by the obtained characterization code of the specified assigned call address code to selectively enable and disable the display of said indication on said display in regard to stored message information corresponding to the specified assigned call address code.

20. The paging receiver in accordance with claim 17 including a display, means for displaying on said display an indication for each message information stored in the memory means, means for selecting a stored message information by selecting the corresponding displayed indication on said display, and means for reading said selected message information by displaying it on said display; wherein the protocol of the accepted call signal is further capable of including an auxiliary message corresponding to the specified assigned call address code; including means for decoding and examining the accepted call signal to identify the presence of and obtain said auxiliary message, and means for storing in said memory means said obtained auxiliary message; and wherein the control means includes means governed by the obtained characterization code of the assigned call address code corresponding to the selected message information to control the reading means to select between displaying the selected message information and the stored auxiliary message of the specified assigned address code corresponding to the selected message information.

21. The paging receiver in accordance with claim 20 including non-volatile memory means; and means for storing each auxiliary message in said non-volatile memory means.

22. The paging receiver in accordance with claim 16 including non-volatile memory means; and means for storing each characterization code and corresponding specified assigned call address code in said non-volatile memory means.

23. The paging receiver in accordance with claim 16 including means for alerting a user of the accepted call signal; and wherein the control means includes second means governed by the obtained characterization code of each specified assigned call address code to selectively enable and disable the alerting means for alerting said user of the accepted call signal corresponding to said specified assigned call address code.

* * * * *